(No Model.)  
2 Sheets—Sheet 1.

J. H. DUNCAN.
Apparatus for Purifying Salt.

No. 236,878. Patented Jan. 25, 1881.

WITNESSES:  
C. Bendixon  
Wm. C. Raymond

INVENTOR:  
John H. Duncan  
per Duell, Laass & Hey  
Atty (No Model.) 2 Sheets—Sheet 2.

J. H. DUNCAN.
Apparatus for Purifying Salt.

No. 236,878. Patented Jan. 25, 1881.

WITNESSES:
C. Bendixon.
Wm C. Raymond.

INVENTOR:
John H. Duncan
per Duell, Laass & Hey
Attys

UNITED STATES PATENT OFFICE.

JOHN H. DUNCAN, OF SYRACUSE, NEW YORK.

APPARATUS FOR PURIFYING SALT.

SPECIFICATION forming part of Letters Patent No. 236,878, dated January 25, 1881.

Application filed November 29, 1880. (No model.)

*To all whom it may concern:*

Be it known that I, JOHN H. DUNCAN, of Syracuse, in the county of Onondaga, in the State of New York, have invented new and useful Improvements in Apparatus for Purifying Salt, of which the following, taken in connection with the accompanying drawings, is a full, clear, and exact description.

This invention relates to a peculiar treatment of salt in process of being washed or scoured; and it consists, essentially, in the application of an air-blast directed over the surface of the washing-liquid in such direction and with such force as to blow therefrom the scum and supernatant substances, substantially as hereinafter more fully described, and specifically set forth in the claims.

Figure 1:
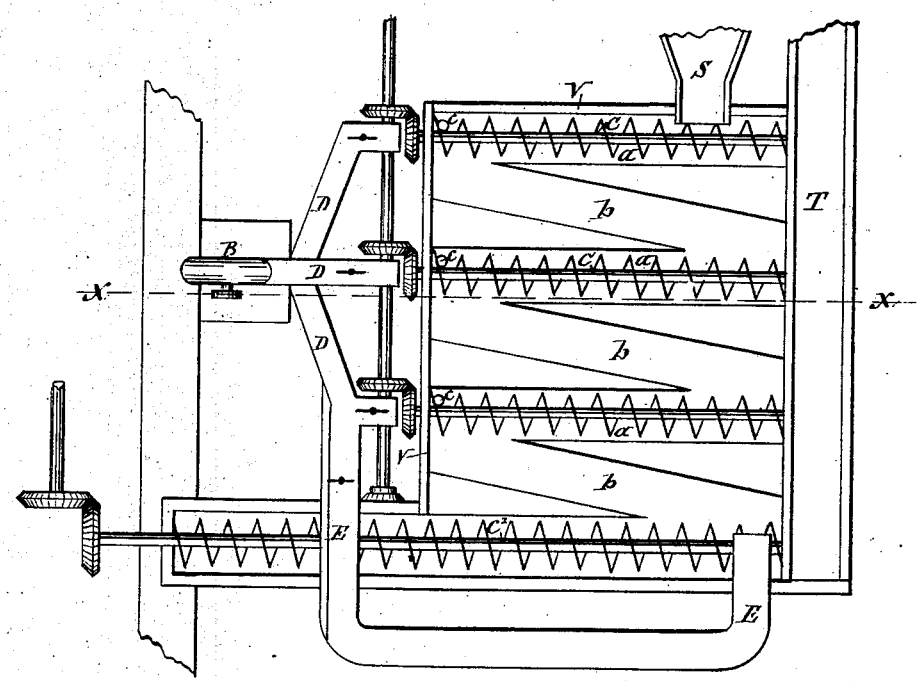
Figure 2:
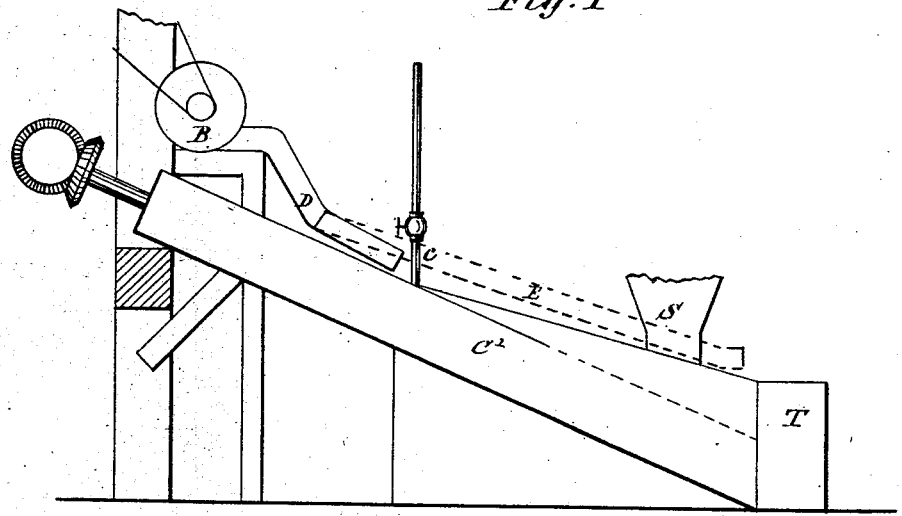
Figure 3:
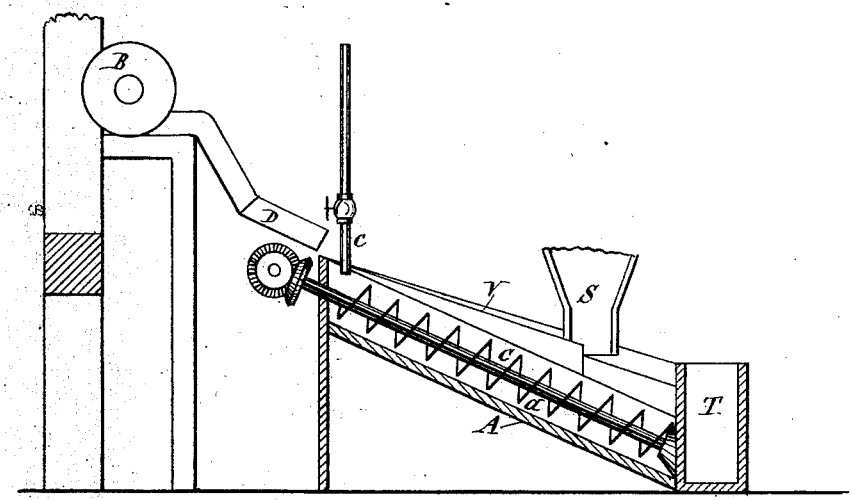
Figure 4:
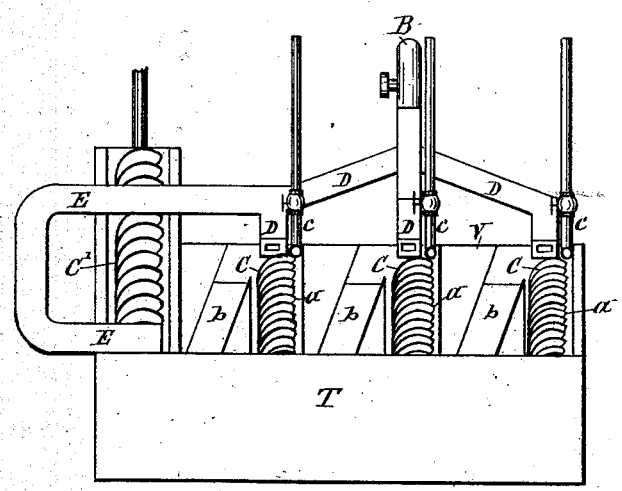

The invention is clearly illustrated in the accompanying drawings, wherein Figure 1 is a plan view of a salt-washing apparatus provided with my invention; Fig. 2, an end view of same; Fig. 3, a transverse section on line $x$ $x$ in Fig. 1; and Fig. 4 is a front elevation.

Similar letters of reference indicate corresponding parts.

V represents a vat having an inclined bottom, A, upon which are built a series of parallel channels, $a$ $a$, communicating with each other by diagonal channels $b$ $b$, extended from the upper end of the channels $a$ to the lower end of the respective succeeding channel. Longitudinally through the channels $a$ are arranged spiral conveyers C, which carry the salt under treatment from the lower part of the vat to the elevated part of same, the salt being introduced by the spout S, which deposits the same in the first channel $a$. From thence the conveyer C carries the salt up the said inclined channel $a$ and over into the diagonal channel $b$, by which it is conducted to the lower end of the succeeding channel $a$, from whence it is again carried up to the elevated part of the vat by the conveyer in the second channel $a$. The salt designed to be washed is thus carried in a zigzag or sinuous course across the vat and eventually discharged therefrom by an enlarged conveyer, C′, at the end of the vat. Simultaneously with the aforesaid traverse of the salt, and the resultant agitation of same, water or brine is admitted thereto at the elevated end of the inclined channels $a$ by inlet-pipes $c$ $c$ in sufficient quantity to submerge the salt. The brine, in its passage through the agitated salt, washes therefrom the impurities, which rise to the surface in the form of scum, and this scum has heretofore been removed by manual labor and the application of scrapers, drawing said scum over the lower edge of the vat and into the adjacent trough T. This method of removing the scum has, however, proved to be expensive and unreliable, and it is chiefly to obviate these difficulties which my invention has for its object; and to attain this object I employ a blower, B, or other suitable means for generating an air-blast, which air-blast I direct over the surface of the brine or washing-liquid in such a manner and direction and with such force as to blow the scum or supernatant substance to a suitable point for its discharge.

In the salt-washing apparatus herein shown I prefer to apply the air-blast by suitable pipes, D D, at the upper end of the several channels $a$, arranged to blow toward the lower end of said channels, so as to prevent the scum from following the salt and brine carried up said channels by the conveyers C, as before described. The scum thus blown toward the front of the vat is prevented from entering the salt-discharge conveyer C′ by a transverse blast-pipe, E, arranged at or near the foot of the said conveyer and exerting its blast against the approach of the scum. The blast from the pipes D D blows the scum over the front edge of the vat and into the adjacent trough T, by which it is carried away.

I do not claim the apparatus for agitating and washing the salt, as I am aware the same is not new. Neither do I wish to confine myself to any particular devices for bringing to or near the surface of the liquid under treatment the substance to be eliminated therefrom; nor do I wish to be limited to any specific devices for generating and directing the air-blast.

What I do claim as new, and desire to secure by Letters Patent, is—

1. The within-described method of purifying salt, consisting, essentially, in introducing the salt to be treated into a vat or other suitable receptacle, and applying thereto water or brine in sufficient quantity to submerge the salt, then agitating or stirring the salt, and directing over the surface of the liquid an air-blast in such direction and with such force as to blow therefrom the scum and supernatant substance, substantially as described.

2. The combination, with a salt-washing apparatus, of an air-blast apparatus or blower having its discharge directed over the surface of the washing-liquid in the receptacle containing the salt under treatment, substantially as and for the purpose set forth.

3. In combination with the vat V, having inclines A, conveyers C, and water-inlets, of the blower B and blast-pipes P, substantially in the manner and for the purpose shown and set forth.

In testimony whereof I have hereunto signed my name and affixed my seal, in the presence of two attesting witnesses, at Syracuse, in the county of Onondaga, in the State of New York, this 10th day of November, 1880.

JOHN H. DUNCAN. [L. S.]

Witnesses:
E. LAASS,
WM. C. RAYMOND.